(12) United States Patent
Funakubo (10) Patent No.: US 8,259,123 B2
(45) Date of Patent: Sep. 4, 2012

(54) IMAGE PROCESSING APPARATUS

(75) Inventor: Noriyuki Funakubo, Hamamatsu (JP)

(73) Assignee: Yamaha Corporation (JP)

( * ) Notice: Subject to any disclaimer, the term of this patent is extended or adjusted under 35 U.S.C. 154(b) by 1095 days.

(21) Appl. No.: 12/132,941

(22) Filed: Jun. 4, 2008

(65) Prior Publication Data
US 2008/0303838 A1    Dec. 11, 2008

(30) Foreign Application Priority Data
Jun. 7, 2007    (JP) ................................ 2007-151544

(51) Int. Cl.
G06F 13/00 (2006.01)
G06F 12/02 (2006.01)
G09G 5/36 (2006.01)
G06T 9/00 (2006.01)

(52) U.S. Cl. ........ 345/536; 345/543; 345/545; 345/547; 345/555; 345/558

(58) Field of Classification Search .......................... None
See application file for complete search history.

(56) References Cited

U.S. PATENT DOCUMENTS

| 6,377,745 B2 * | 4/2002 | Akiba et al. | 386/239 |
| 6,628,719 B1 | 9/2003 | Kono et al. | |
| 7,893,943 B1 * | 2/2011 | West | 345/543 |
| 2005/0013586 A1 * | 1/2005 | Bhatia et al. | 386/68 |
| 2005/0237326 A1 * | 10/2005 | Kuhne | 345/506 |

FOREIGN PATENT DOCUMENTS

| JP | 10-224739 A | 8/1998 |
| JP | 2000-165816 A | 6/2000 |
| JP | 2000-232649 A | 8/2000 |
| JP | 2007-060480 A | 3/2007 |

OTHER PUBLICATIONS

Reasons for Refusal issued in corresponding Japanese Patent Application No. 2007-151544 dated Mar. 24, 2009.

* cited by examiner

Primary Examiner — Daniel Washburn
Assistant Examiner — Donna Ricks
(74) Attorney, Agent, or Firm — Rossi, Kimms & McDowell LLP (57) ABSTRACT

An image processing apparatus processes compression encoded data of a moving picture and outputs image data divided into a plurality of frames for displaying of the moving picture on a display device. A host CPU outputs a decoding command and a drawing command separately from each other. The decoding process on the compression encoded data can be performed in an independent manner from the drawing process of reflecting the image data, which are the decoding results, on the display object. At this time, a display control section executes the drawing process based on the image data stored in a ring buffer in accordance with the drawing command. Therefore, the host CPU can freely control timings at which the moving pictures are displayed on the display device.

8 Claims, 5 Drawing Sheets

IMAGE PROCESSING APPARATUS

This application is based on, and claims priority from, Japanese Patent Application No: 2007-151544, filed on Jun. 7, 2007. The disclosure of the priority application, in its entirety, including the drawings, claims, and the specification thereof, is incorporated herein by reference.

BACKGROUND OF THE INVENTION

1. Technical Field

The present invention relates to an image processing apparatus equipped with a moving picture decoding function and a drawing function for displaying image data, which are the decoding results, on a display screen.

2. Background Art

A variety of image processing apparatuses are known, which are capable of storing compression encoded data ob a moving picture obtained through compression algorithm such as MPEG (Moving Picture Expert Group) and decoding the compression encoded data to thereby display image data, which are the decoding results, on a display device. In such a kind of image processing apparatus, the display device displays the image data at a rate of one frame per one vertical scanning in synchronism with a vertical scanning period, which is a constant time length. To the contrary, the required time for the decoding process to acquire one-frame image data from the compression encoded data is uneven between frames. Moreover, if the processing capability of a decoder performing the decoding process is insufficient, the decoding process is out of synchronism with the vertical scanning period, which is an image display period, and therefore, a problem occurs in that the frame on which the decoding process was out of synchronism is erroneously displayed on a display device.

As a technical means for solving such a problem, for example, one disclosed in Patent Document JP-A-2000-232649 is known. An MPEG video decoder disclosed in Patent Document JP-A-2000-232649 includes a picture decoding section, a decoding start command generating section, a decoding frame buffer, and a picture data output section. Here, the picture decoding section starts decoding of a MPEG bit-stream for a predetermined number of pictures (synonymous with the "frame") in response to a decoding start command, and outputs a decoding completion notification when the decoding of the bit-stream for the predetermined number of pictures is completed. The decoding frame buffer sequentially stores picture data decoded by the picture decoding section, and outputs a buffer-full notification when a predetermined quantity of picture data (synonymous with the "image data") are stored. The decoding start command generating section outputs the decoding start command when the decoding completion notification is output from the picture decoding section and the buffer-full notification is not output from the decoding frame buffer. The picture data output section transmits the picture data stored in the decoding frame buffer to the display device.

According to the MPEG video decoder, the picture decoding section continues the decoding process of the MPEG bit-stream asynchronous with the operation of the display device until the buffer-full notification is output from the decoding frame buffer, and the picture data, which are the decoding results, are sequentially stored in the decoding frame buffer, whereby the picture data output section can transmit the picture data stored in the decoding frame buffer to the display device. Therefore, the problem that the decoding process on some of the pictures is out of synchronism and the pictures are erroneously displayed on the display device can be resolved.

In an image processing apparatus which is used in a game machine such as a Pachinko machine, however, in order to enhance the presentation effect at the time of reproducing moving pictures along with sound effects, there is required a function of freely controlling a display start time of the display device starting the display of the moving pictures. However, in the prior art as disclosed in Patent Document JP-A-2000-232649, although the decoding process on the compression encoded data can be performed in asynchronism with the vertical scanning of the display device, the image data, which are the decoding results, are displayed on the display device when it comes to their turn in the decoding frame buffer. Therefore, there is a problem that it is difficult to freely control the time at which the image data, which are the decoding results, are displayed on the display device.

SUMMARY OF THE INVENTION

The present invention has been made in view of the above-described circumstances, and an object of the present invention is to provide an image processing apparatus capable of performing a decoding process on compression encoded data of a moving picture in an independent manner from a drawing process of displaying image data, which are the decoding results, on a display device, and moreover, capable of controlling the timings of the drawing process.

The present invention provides an image processing apparatus for processing compression encoded data of a moving picture and outputting image data divided into a plurality of frames for displaying of the moving picture on a display device. The inventive image processing apparatus comprises: a compressed moving picture memory that stores the compression encoded data of the moving picture; a work memory that is rewriteable; a decoding section that uses a storage area of the work memory as a ring buffer composed of a plurality of frame buffers, each frame buffer being capable of storing image data of one frame, that executes a decoding process on the compression encoded data of the moving picture stored in the compressed moving picture memory while selecting one of the frame buffers of the ring buffer in a circular manner, and that stores the image data which is a decoding result of the compression encoded data of the moving picture in the selected frame buffer; a frame memory that stores image data to be displayed on the display device; a controller that outputs a decoding command to the decoding section to initiate the decoding process of the compression encoded data of the moving picture stored in the compressed moving picture memory, and that outputs a drawing command involving designation of a frame buffer among the frame buffers of the ring buffer, the designated frame buffer storing the image data to be subjected to a drawing process of the moving picture; and a display control section that performs the drawing process for displaying the image data stored in the frame memory on the display device, the display control section being configured to receive the drawing command from the controller, to read the image data from the frame buffer designated by the drawing command among the frame buffers of the ring buffer, and to reflect the read image data on the image data stored in the frame memory.

According to the present invention, the controller such as a host CPU outputs a decoding command and a drawing command as a separate command, whereby the decoding process on the compression encoded data can be performed in an independent manner from the drawing process of reflecting the image data, which are the decoding results, on the display object. At this time, the display control section executes the drawing process based on the image data stored in the ring buffer in accordance with the drawing command. Therefore, the controller can freely control the timings at which the moving pictures are displayed on the display device.

DETAILED DESCRIPTION OF THE INVENTION

Hereinafter, an embodiment of the present invention will be described with reference to the accompanying drawings.

Figure 1:
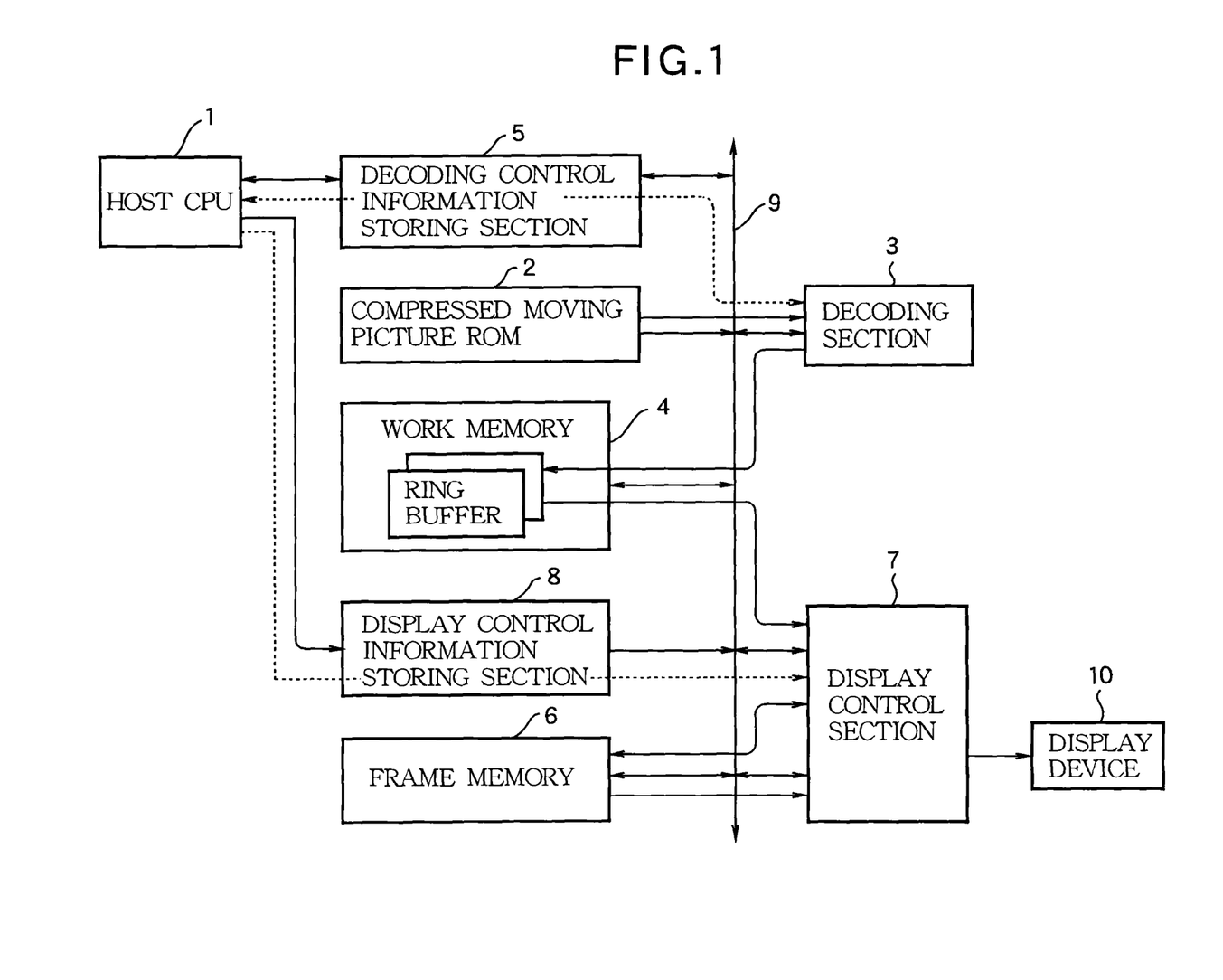
FIG. 1 is a block diagram illustrating the construction of an image processing apparatus according to an embodiment of the present invention.

FIG. 1 is a block diagram illustrating the construction of a moving picture processing apparatus according to an embodiment of the present invention. The image processing apparatus performs image processing in a game machine such as a pachinko machine. As shown in the drawing, the image processing apparatus includes a host CPU 1, a compressed moving picture ROM 2, a decoding section 3, a work memory 4, a decoding control information storing section 5, a frame memory 6, a display control section 7, a display control information storing section 8, and a bus 9 for connecting the above elements to each other. In addition, the image processing apparatus includes a display device 10 constructed by a liquid crystal display panel or the like, and the display device 10 is connected to the display control section 7.

The host CPU 1 is a controller or an overall control center of the image processing apparatus, and is operable to generate image data of a variety of moving pictures or still pictures in response to a variety of events generated in the course of the progress of a game, and performs control of each of the sections for displaying the image data on the display device 10.

The compressed moving picture ROM 2 stores therein compression encoded data of a variety of moving picture scenes to be reproduced in response to a variety of events. The compression encoded data are obtained by subjecting the image data of a series of frames constituting the moving picture scenes to a compression encoding process involving motion compensation. The compression encoded data are composed of a small number of keyframe data and a number of interframe data. Among them, the keyframe data are compression encoded data obtained by performing an intraframe encoding process using only the image data of a frame to be encoded without referring to the image data of other frames. The keyframe data are the compression encoded data of the first frame of the moving picture scenes. Meanwhile, the interframe data are compression encoded data obtained from the image data of the frames to be encoded by performing an interframe encoding process involving motion compensation by referring to the image data of a preceding frame just before the frame to be encoded.

The decoding section 3 is a device that reads compression encoded data of one or plural moving pictures from the compressed moving picture ROM 2 in accordance with a command from the host CPU 1 and performs decoding thereon. The work memory 4 is a rewritable memory used to temporarily store a variety of computation results and is constructed, for example, by a DRAM (Dynamic Random Access Memory). In the present embodiment, the decoding section 3 uses a FIFO (First In First Out) ring buffer composed of at least three frame buffers prepared in a storage area of the work memory 4 under the control of the host CPU 1. Here, each of the frame buffers has a capacity capable of storing image data for one frame. Moreover, the decoding section 3 is operable to select one of the frame buffers constituting the ring buffer in a circular manner to thereby store the image data for each frame, which are the decoding results, in the selected buffer, during the decoding process of the compression encoded data. Moreover, in the decoding process of the above-described interframe data, the decoding section 3 executes the decoding process by referring to the image data of a preceding frame just before the frame to be decoded among the image data stored in the ring buffer. There is a case where the host CPU 1 instructs the decoding section 3 to perform the decoding process on a plurality of moving pictures at the same time. In such a case, the decoding section 3 configures the ring buffer in the work memory 4 for each moving picture and executes the decoding process on each moving picture in a parallel manner.

The decoding control information storing section 5 is a rewritable memory that is provided for exchange of information between the host CPU 1 and the decoding section 3. The host CPU 1 supplies a variety of commands on the decoding process to the decoding section 3 via the decoding control information storing section 5, and acquires a variety of status information on the decoding process from the decoding section 3 via the decoding control information storing section 5.

The frame memory 6 is a memory for storing therein image data to be displayed on the display device 10. The display control section 7 repeats the control for displaying the image data stored in the frame memory 6 on the display device 10 every vertical scanning period of a predetermined time length.

The display control section 7 is operable to read the image data, which are the decoding results of the compression encoded data, from the ring buffer in the work memory 4 in accordance with a drawing command sent from the host CPU 1, and executes a drawing process of reflecting the image data stored in the ring buffer on the image data to be displayed in the frame memory 6. The drawing process includes a process of enlarging, reducing, rotating, and the like of the image data (moving pictures) read from the ring buffer and a process of blending or the like of the image data (moving pictures) having undergone the process with a background image. When instructing the decoding section 3 to perform the decoding process on a plurality of moving pictures at the same time as described above, the host CPU 1 instructs the display control section 7 to perform the drawing process on each of the moving pictures. The display control information storing section 8 is a rewritable memory that is provided for exchange of information and commands between the host CPU 1 and the display control unit 7. The host CPU 1 supplies a variety of control information and commands on the drawing process to the display control unit 7 via the display control information storing section 8.

Hereinabove, an outline of the construction of the image processing apparatus according to the present embodiment has been described. The image processing apparatus has the following features.

<Feature 1>

The decoding process of decoding the compression encoded data and storing the image data, which are the decoding results, in the ring buffer, and the drawing process of reflecting the image data stored in the ring buffer on a display screen of the display device 10 are performed in an asynchronous manner.

<Feature 2>

The drawing process is executed at a desired timing in accordance with the drawing command from the host CPU 1.

<Feature 3>

The decoding process and the drawing process are performed on a plurality of moving pictures in a parallel manner whereby the decoding process and the drawing process are controlled to be performed for each moving picture in an independent manner.

Figure 2:
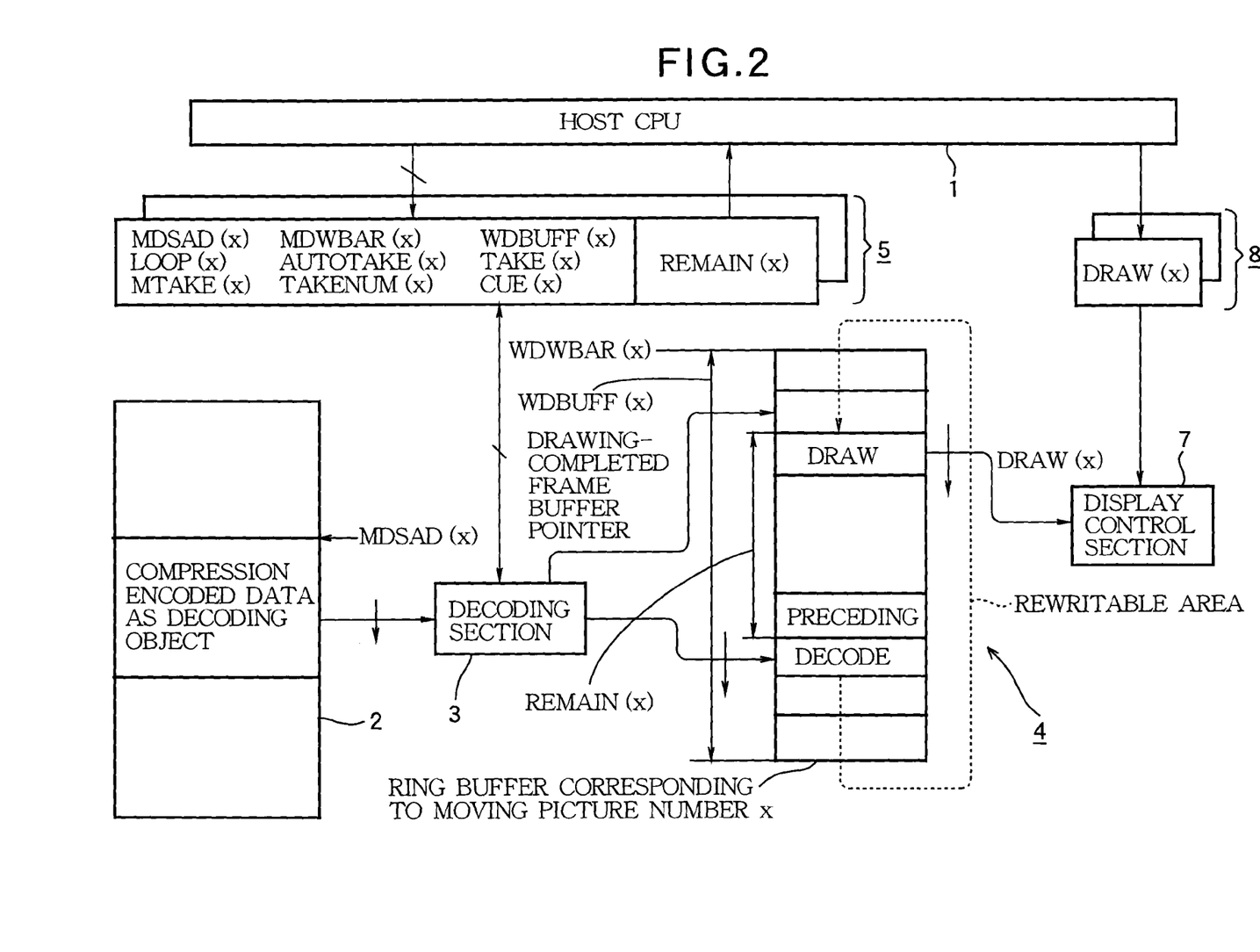
FIG. 2 is a block diagram illustrating the detailed construction related to a decoding process and a drawing process according to the embodiment.

Now, the structure for enabling such a characteristic process according to the present embodiment will be described with reference to FIG. 2. In the present embodiment, when instructing the decoding section 3 to execute the decoding process on the compression encoded data of one of plural moving pictures, the host CPU 1 assigns a moving picture number x to each moving picture, and writes control information on the decoding process in the decoding control information storing section 5 in correspondence to the moving picture number x. Main components of the control information are as follows.

Start Address MDSAD(x):

This is the address of the starting storage area of a series of storage areas at which the compression encoded data for the moving picture number x in the compressed moving picture ROM 2 are stored. Upon receipt of a decoding start command (described later) on the moving picture number x, the decoding section 3 sequentially reads the compression encoded data from the storage area in the compressed moving picture ROM 2 designated by the start address MDSAD(x), and executes the decoding process thereon.

Ring Buffer Start Address MDWBAR(x):

This is the address of the starting storage area of the ring buffer for use in storing the decoding results of the moving picture for the moving picture number x in the work memory 4.

Frame Buffer Number WDBUFF(x):

This is a number of frame buffers of the ring buffer for use in storing the decoding results of the moving picture for the moving picture number x in the work memory 4. The decoding section 3 configures the ring buffer in the work memory 4, the ring buffer being composed of a number of frame buffers corresponding to the number indicated by the frame buffer number WDBUFF(x) by using a series of storage areas starting from the ring buffer start address MDWBAR(x).

Decoding Start Command CUE(x):

This is one-bit information indicating the start of the decoding process of the moving picture for the moving picture number x. The host CPU 1 sets CUE(x) to "1" when it enables to start the decoding process of the moving picture for the moving picture number x.

Loop Playback Command LOOP(x):

This is one-bit control information for instructing whether or not the moving pictures are to be played back in a loop manner. For the case of LOOP="0," the decoding section 3 terminates the decoding process at a time point when the decoding of the compression encoded data for the last frame of the moving picture for the moving picture number x is completed. On the other hand, for the case of LOOP="1," the decoding section 3 repeats the decoding process by returning to the compression encoded data for the starting frame after the compression encoded data for the last frame of the moving picture for the moving picture number x is completed.

Frame Buffer Pointer Automatic Update Command AUTOTAKE(x):

This is one-bit control information for instructing whether or not automatic update of a drawing-completed frame buffer pointer is to be executed in synchronism with the vertical scanning of the display device 10. Here, the drawing-completed frame buffer pointer is a pointer which is used by the decoding section 3 and memorized for each moving picture to be decoded, the pointer being one that indicates, among the frame buffers constituting the ring buffer, a frame buffer for which the drawing process on the image data in the frame buffer is just completed and which is released for storage of the decoding results. The host CPU 1 sets AUTOTAKE(x) to "1" when it enables the automatic update of the drawing-completed frame buffer pointer. The decoding section 3 regards a range from a frame buffer subsequent to the frame buffer having stored therein the recent decoding results to the frame buffer indicated by the drawing-completed frame buffer pointer as a writable area of new decoding results, and continues the decoding process and the storing of the decoding results in the frame buffer as long as the writable area is present.

Automatic Update Start Command TAKE(x):

This is one-bit control information for instructing the start of the automatic update of the above-described drawing-completed frame buffer pointer. In the state of the frame buffer pointer automatic update command AUTOTAKE(x) being "1," when the host CPU 1 sets the automatic update start command TAKE(x) to "1," for a time afterwards, the decoding section 3 advances the drawing-completed frame buffer pointer by one frame buffer every two vertical blanking signals VB (that is, every 2 field periods=every one frame period) synchronized with the vertical scanning of the display device 10.

Manual Update Command MTAKE(x):

This is one-bit control information on the update of the drawing-completed frame buffer pointer, which is effective only when AUTOTAKE(x) is "0." The above-described automatic update start command TAKE(x) is for instructing the start of continuous automatic update of the drawing-completed frame buffer pointer, while the manual update command MTAKE(x) is for instructing once-only update of the drawing-completed frame buffer pointer. That is, when the host CPU 1 sets the manual update command MTAKE(x) to "1," the decoding section 3 updates the drawing-completed frame buffer pointer only one time in response to the vertical blanking signal VB generated immediately after the setting, and returns the manual update command MTAKE(x) to "0."

Update Frame Buffer Number TAKENUM(x):

This is control information for indicating a number of frame buffers to be updated when the decoding section 3 updates the drawing-completed frame buffer pointer in response to the manual update command MTAKE(x). The decoding section 3 advances the drawing-completed frame buffer pointer by a number of frame buffers corresponding to the value indicated by the update frame buffer number TAKENUM(x) when the manual update command MTAKE(x) is set to "1."

The decoding section 3 executes the decoding process of the compression encoded data of the moving picture for the moving picture number x in accordance with the above-described control information. In the course of execution of the decoding process, the decoding section 3 monitors the position of the frame buffer in the ring buffer as indicated by the drawing-completed frame buffer pointer and the position of the frame buffer which is a storage destination of present decoding results, generates a drawing-uncompleted frame number REMAIN(x), which is status information representing a number of frames among the decoded frames, for which the drawing process has not yet completed, based on the monitoring results, and writes the drawing-uncompleted frame number REMAIN(x) in the decoding control information storing section 5. By monitoring the drawing-uncompleted frame number REMAIN(x), the host CPU 1 is informed of the progress state of the decoding process on the moving picture for the moving picture number x in the decoding section 3.

The host CPU 1 sets the decoding start command CUE(x) to "1" to start the decoding process on the moving picture for the moving picture number x, whereby it becomes possible to write a drawing command DRAW(x) in the display control information storing section 8 at a desired time. The drawing command DRAW(x) contains an address that designates the frame buffer which is a storage destination of the image data to be drawn among the frame buffers of the ring buffer corresponding to the moving picture number x. Whenever the drawing command DRAW(x) is written to the display control information storing section 8, the display control section 7 reads the image data from the frame buffer designated by the address in the drawing command DRAW(x) among the frame buffers of the ring buffer corresponding to the moving picture number x to thereby execute the drawing process of reflecting the image data of the designated frame buffer on the image data in the frame memory 6. In the present embodiment, the host CPU 1 writes the drawing command DRAW(x) including an address, which is a read destination of the image data, in the display control information storing section 8 whenever the host CPU instructs the display control section 7 to execute the drawing process.

Hereinabove, the details of the control information on the decoding process and the drawing process according to the present embodiment and the control performed in accordance with the control information have been described. In the present embodiment, the host CPU 1 can execute the decoding process on one or plural moving pictures and the drawing process according to the following aspects.

<Mode 1 of Decoding Process and Drawing Process>

In this mode, at an arbitrary time after the decoding process is started and the decoding results are stored in the ring buffer, the drawing process is started, and at the same time, the drawing-completed frame buffer pointer is automatically updated in synchronism with the vertical scanning of the display device. This mode is effective when the drawing process is performed at a normal frame rate inherent in the moving pictures subsequent to the start of the decoding process. The outlines of the procedures for advancing the processes in this mode are as follows.

(a) The frame buffer pointer automatic update command AUTOTAKE(x) is set to "1."

(b) The decoding process on the moving picture for the moving picture number x is started by setting the decoding start command CUE(x) to "1", and image data, which are the decoding results, are stored in the ring buffer corresponding to the moving picture number x.

(c) The drawing process synchronized with the vertical scanning is started at a desired time when image data for a sufficient number of frames are stored in the ring buffer. The drawing process for one vertical scanning is performed when the drawing command DRAW(x) including designation of the address of the frame buffer, which is a storage destination of the image data for use in the drawing process, is written to the display control information storing section 8.

(d) The drawing frame automatic update start command TAKE(x) is set to "1" in synchronism with the start of the drawing process. With this setting, for a time afterwards, the decoding section 3 automatically updates the drawing-completed frame buffer pointer in synchronism with the vertical scanning.

<Mode 2 of Decoding Process and Drawing Process>

Similarly, in this mode, at an arbitrary time after the decoding process is started and the decoding results are stored in the ring buffer, the drawing process is started; however, the drawing-completed frame buffer pointer is not automatically updated. In this mode, the host CPU 1 instructs the decoding section 3 to update the drawing-completed frame buffer pointer each time the frame buffer for use in the drawing process is changed. This mode is effective when the drawing process is performed at a rate different from the rate inherent in the moving pictures. The outlines of the procedures for advancing the processes in this mode are as follows.

(a) The frame buffer pointer automatic update command AUTOTAKE(x) is set to "0." The update frame buffer number TAKENUM(x) is set to a desired value.

(b) The decoding process on the moving picture for the moving picture number x is started by setting the decoding start command CUE(x) to "1", and image data, which are the decoding results, are stored in the ring buffer corresponding to the moving picture number x.

(c) The drawing process synchronized with the vertical scanning is started at a desired time when image data for a sufficient number of frames are stored in the ring buffer. The drawing process for one vertical scanning is performed when the drawing command DRAW(x) including designation of the address of the frame buffer, which is a storage destination of the image data for use in the drawing process, is written to the display control information storing section 8.

(d) When the address of the frame buffer for use in the drawing process is updated, the manual update command MTAKE(x) is correspondingly set to "1." With this setting, the decoding section 3 updates the drawing-completed frame buffer pointer only one time by a number of frame buffers corresponding to the value indicated by the update frame buffer number TAKENUM(x) in synchronism with the subsequent vertical blanking signal VB just after the setting, and after the update, returns the manual update command MTAKE(x) to "0."

In this mode, it is possible to arbitrarily determine the number of frame buffers by which the drawing-completed frame buffer pointer is to be updated when the manual update command MTAKE(x) is set to "1." Therefore, it is possible to arbitrarily determine the number of frame buffers by which the address of the frame buffer for use in the drawing process is to be updated. Therefore, for example, under the condition that the update interval of the address of the frame buffer for use in the drawing process (that is, the occurrence interval of the manual update command MTAKE(x)) remains the same, low-speed playback of the moving pictures can be performed by decreasing the number of frame buffers for one update, or alternatively, high-speed playback of the moving pictures can be performed by increasing the number of frame buffers for one update.

<Other Modes>

In the present embodiment, for a plurality of moving pictures, the decoding process and the drawing process can be performed in a parallel manner. At that time, one of the two modes can be arbitrarily selected for each moving picture.

Next, specific operation examples of the present embodiment will be described with reference to FIGS. 3 to 5.

SPECIFIC OPERATION EXAMPLE 1

Figure 3:
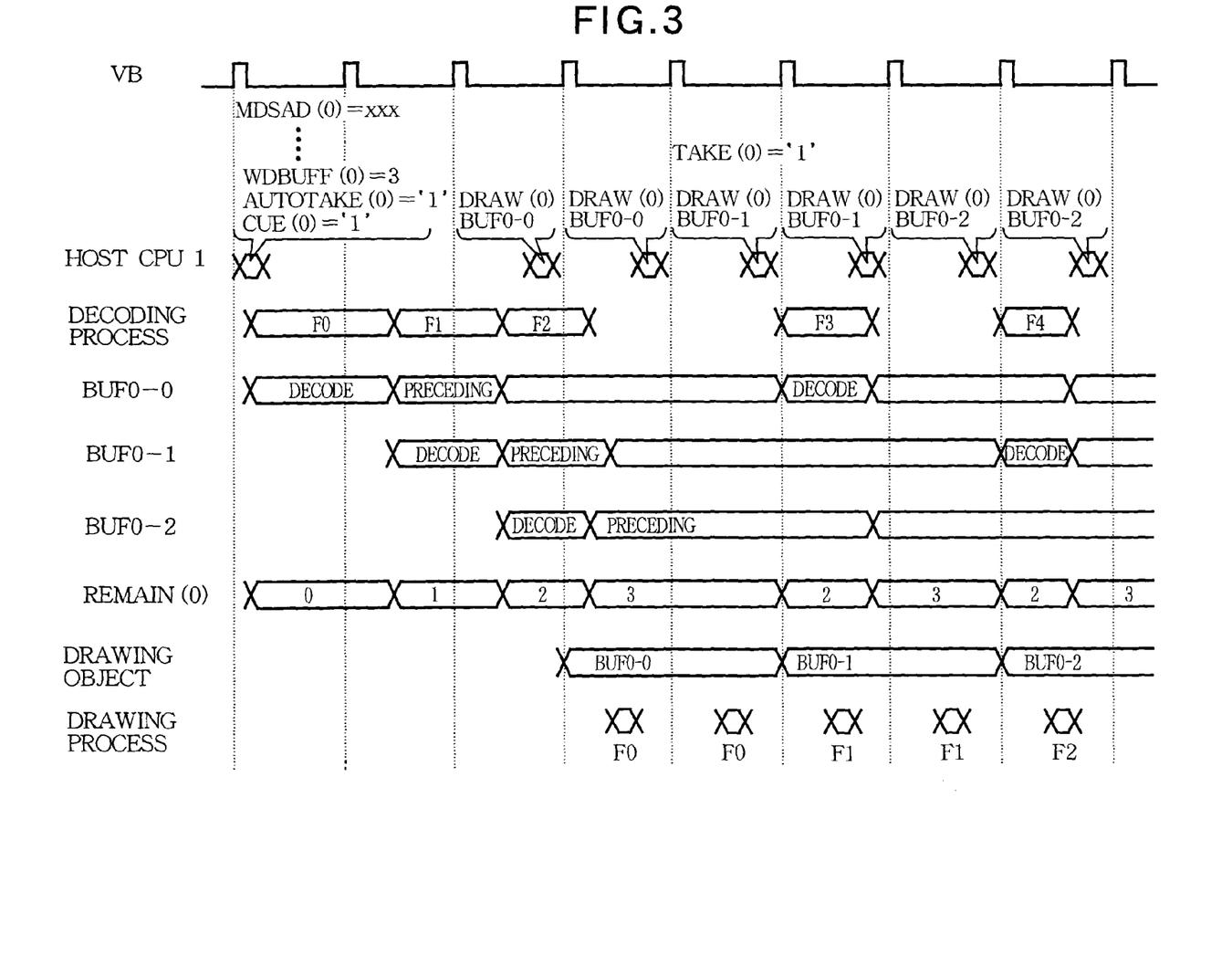
FIG. 3 is a time chart illustrating a specific operation example 1 according to the embodiment.

In the example illustrated in FIG. 3, the host CPU 1 causes the decoding section 3 and the display control section 7 to perform the decoding process and the drawing process on one kind of moving pictures. When enabling to start the decoding process on the moving pictures, the host CPU 1 sets the moving picture number x to 0 and writes a variety of control information necessary for the decoding process such as the start address MDSAD(0) in the decoding control information storing section 5. In addition, in this example, the host CPU 1 sets the buffer number WDBUFF(0) to "3," the frame buffer pointer automatic update command AUTOTAKE(0) to "1," and the decoding start command CUE(0) to "1."

When the decoding start command CUE(0) in the decoding control information storing section 5 is set to "1," the decoding section 3 configures, in the work memory 4, a ring buffer composed of three frame buffers BUF0-0, BUF0-1, and BUF0-2 since the buffer number WDBUFF(x) is "3," and starts the decoding process on the compression encoded data in a series of storage areas in the compressed moving picture ROM 2, the storage areas starting from the start address MDSAD(0).

First, in the course of the decoding process for the first frame F0, the decoding section 3 stores the image data, which are the decoding results, in the frame buffer BUF0-0 in the ring buffer. Then, upon completion of the decoding process for the frame F0, the drawing-uncompleted frame number REMAIN(0) in the decoding control information storing section 5 is updated from the initial value "0" to "1."

Next, the discharge cells 3 starts the decoding process for the second frame F1, and in this course, stores the image data, which are the decoding results, in the frame buffer BUF0-1 of the ring buffer. At this time, in the frame buffer BUF0-0, the image data for a preceding frame just before the frame for which the decoding process is presently performed are stored. Therefore, if the compression encoded data for the frame F1 to be decoded are the interframe data, the decoding process is performed by referring to the image data for the preceding frame (in this case, the frame F0) in the frame buffer BUF0-0. Upon completion of the decoding process for this frame F1, the drawing-uncompleted frame number REMAIN(0) in the decoding control information storing section 5 is updated from "1" to "2."

Next, the decoding section 3 starts the decoding process for the third frame F2, and in this course, stores the image data, which are the decoding results, in the frame buffer BUF0-2 of the ring buffer. At this time, if the compression encoded data for the frame F2 to be decoded are the interframe data, the decoding process is performed by referring to the image data for the preceding frame (in this case, the frame F1) in the frame buffer BUF0-1. Upon completion of the decoding process for this frame F2, the drawing-uncompleted frame number REMAIN(0) in the decoding control information storing section 5 is updated from "2" to "3."

In this example, since the buffer number WDBUFF(0) is "3," the drawing-uncompleted frame number REMAIN(0) being "3" means that the ring buffer is full with the image data for the drawing-uncompleted frames. Therefore, the decoding section 3 temporarily stops the decoding process at this time point.

Thereafter, in each of two successive vertical scanning periods, the host CPU 1 writes the drawing command DRAW(0) for the frame F0, that is, the drawing command DRAW(0) including designation of the address of the frame buffer BUF0-0 having stored therein the image data for the frame F0, in the display control information storing section 8. This is because in the present embodiment, the time length of one frame of the moving picture is twice that of the vertical scanning period of the display device 10, and it is therefore necessary that the image data for one frame are to be used in two successive vertical scanning periods.

When the drawing command DRAW(0) is written to the display control information storing section 8, the display control section 7 detects the contents of the drawing command DRAW(0) in synchronism with the subsequent vertical blanking signal VB generated immediately after that and executes the drawing process instructed by the drawing command DRAW(0) within the vertical scanning period starting from the vertical blanking signal VB: that is, the drawing process of reflecting the image data for the frame F0 in the frame buffer BUF0-0 on the image data in the frame memory 6 is performed. The same operation is performed when the drawing command DRAW(0) is thereafter written to the display control information storing section 8.

Then, in each of the subsequent two successive vertical scanning periods, the host CPU 1 writes the drawing command DRAW(0) on the image data for the frame F1 in the frame buffer BUF0-1 in the display control information storing section 8, and moreover, in each of the subsequent two successive vertical scanning periods, the host CPU 1 writes the drawing command DRAW(0) on the image data for the frame F2 in the frame buffer BUF0-2 in the display control information storing section 8. In this manner, for each of the successive two vertical scanning periods, the frame buffer, which is a read destination of the image data, is updated in a sequential and circular manner, whereby the drawing process using the image data in the frame buffers is performed by the display control section 7.

On the other hand, in a vertical scanning period after the second drawing command DRAW(0) on the first frame F0 is written to the display control information storing section 8, the host CPU 1 writes the drawing command DRAW(0) on the frame F1 in the display control information storing section 8, and at the same time, sets the automatic update start command TAKE(x) in the decoding control information storing section 5 to "1." In this manner, when the automatic update start command TAKE(x) is set to "1," the decoding section 3 sets the value indicating the frame buffer BUF0-0 as the value of the drawing-completed frame buffer pointer at the occurrence time of the subsequent vertical blanking signal VB.

When the drawing-completed frame buffer pointer has a value indicating the frame buffer BUF0-0, the decoding section 3 decreases the drawing-uncompleted frame number REMAIN(0) from "3" to "2" and starts the decoding process on the frame F3 by using the frame buffer BUF0-0, which is in the usable state, as the storage destination of the decoding results. Then, when the decoding process on the frame F3 is completed and the image data for the frame F3 are stored in the frame buffer BUF0-0, the decoding section 3 increases the drawing-uncompleted frame number REMAIN(0) in the decoding control information storing section 5 from the initial value "2" to "3." Then, the decoding section 3 temporarily stops again the decoding process since the drawing-uncompleted frame number REMAIN(0) is "3."

Subsequently, when the vertical blanking signal VB is generated immediately after the automatic update start command TAKE(x) is set to "1" and when two vertical blanking signals VB are generated thereafter, the decoding section 3 terminates the drawing process on the image data for the frame buffer BUF0-1 and determines that the host CPU 1 has changed the drawing object from the frame buffer BUF0-1 to the frame buffer BUF0-2. Then, the decoding section 3 updates the drawing-completed frame buffer pointer to the value indicating the frame buffer BUF0-1, and at the same time, decreases the drawing-uncompleted frame number REMAIN(0) from "3" to "2." Thereafter, the decoding section 2 starts the decoding process on the frame F4 by using the frame buffer BUF0-1, which is in the usable state, as the storage destination of the decoding results.

The same operations are hereinafter performed in a manner similar to the above. Specifically, the decoding section 3 updates the drawing-completed frame buffer pointer in a circular manner every two vertical blanking signals VB to thereby advance the decoding process by using the frame buffers in the usable state up to the frame buffer indicated by the drawing-completed frame buffer pointer.

In this way, according to the present embodiment, the host CPU 1 sets the decoding start command CUE(0) to "1" to enable the decoding section 3 to start the decoding process, and thereafter, at an arbitrary time, writes the drawing command DRAW(0) including designation of the address of the frame buffer to be drawn in the display control information storing section 8 whereby the drawing object can be reflected on the display screen. In addition, according to the present embodiment, when the frame buffer pointer automatic update command AUTOTAKE(0) is set to "1," the host CPU 1 sets the automatic update start command TAKE(x) to "1" when it is desired to start the drawing process. By doing this, the decoding section 3 automatically updates the drawing-completed frame buffer pointer based on the occurrence state of the vertical blanking signal VB to thereby advance the decoding process in asynchronism with the drawing process by using the frame buffers in the usable state up to the frame buffer indicated by the drawing-completed frame buffer pointer. In this way, in the present embodiment, when the frame buffer pointer automatic update command AUTOTAKE(0) is set to "1," the decoding section 3 updates the drawing-completed frame buffer pointer based on the occurrence state of the vertical blanking signal VB to thereby independently determine whether the decoding process is to be advanced or temporarily stopped based on the drawing-completed frame buffer pointer. Therefore, it is possible to provide advantage that the control load imposed on the host CPU 1 as to the advance of the decoding process is obviated.

SPECIFIC OPERATION EXAMPLE 2

Figure 4:
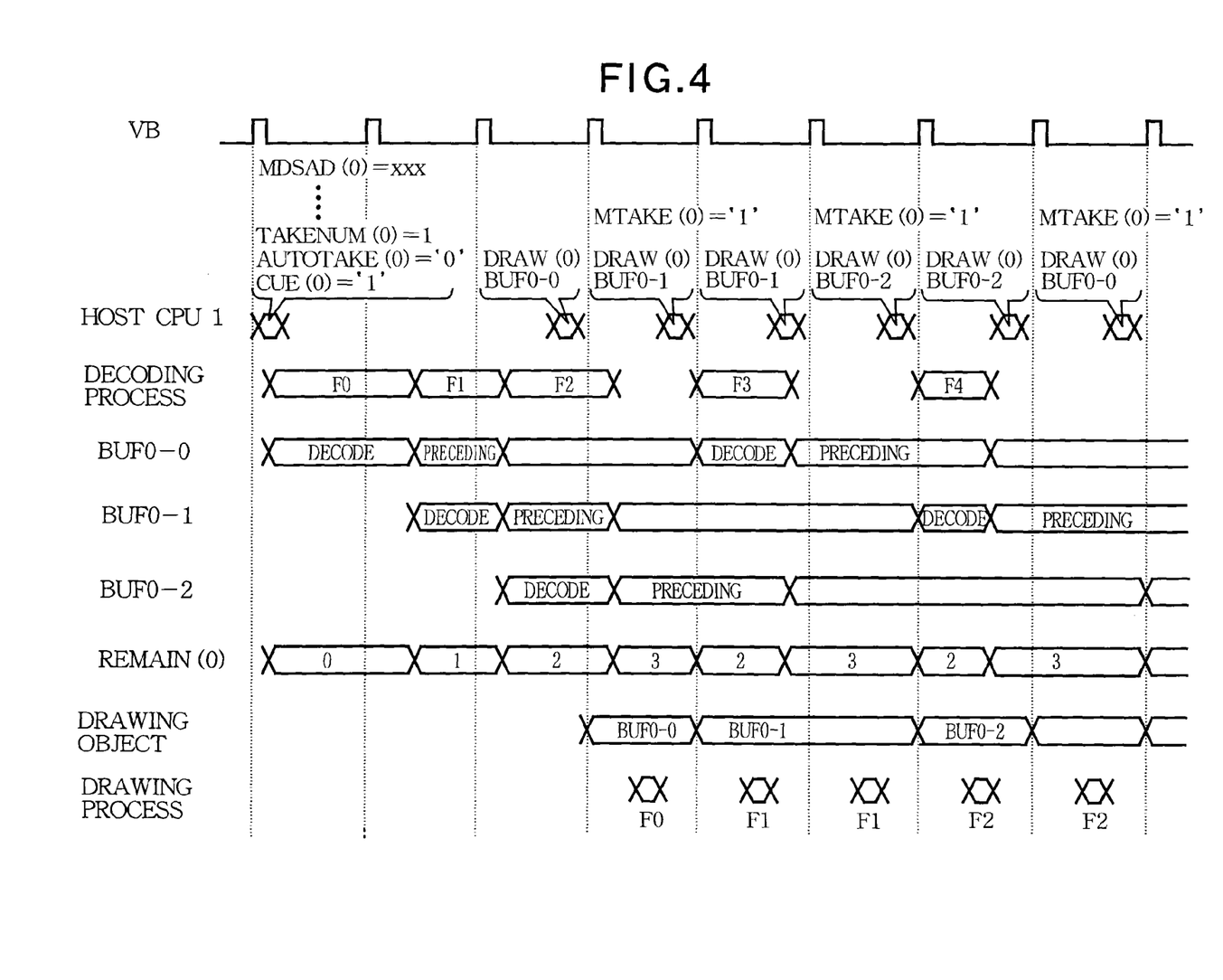
FIG. 4 is a time chart illustrating a specific operation example 2 according to the embodiment.

In the example illustrated in FIG. 4, the host CPU 1 causes the decoding section 3 and the display control section 7 to perform the decoding process and the drawing process on one kind of moving pictures. When enabling to start the decoding process on the moving pictures, the host CPU 1 the frame buffer pointer automatic update command AUTOTAKE(0) to "0," the update frame number TAKENUM(0) to "1," and the decoding start command CUE(0) to "1." Other conditions are the same as those of the specific operation example 1.

Similarly, in this example, since the decoding start command CUE(0) is set to "1," the decoding section 3 the decoding process on the frames F0, F1, and F2 by sequentially using the frame buffers BUF0-0, BUF0-1, and BUF0-2. Moreover, in this example, when the decoding section 3 performs the decoding process on the frame F2 and the image data, which are the decoding results, are stored in the frame buffer BUF0-2, the host CPU 1 writes the drawing command DRAW(0) on the image data for the frame F0 in the frame buffer BUF0-0 in the display control information storing section 8.

The specific operation example 2 is different from the specific operation example 1 in that when updating the address of the frame buffer for use in the drawing process, the host CPU 1 sends the manual update command MTAKE(x) to the decoding section 3.

First, in a vertical scanning period subsequent to the vertical scanning period in which the drawing command DRAW(0) on the image data for the frame F0 is written in the display control information storing section 8, the host CPU 1 writes the drawing command DRAW(0) for the image data for the frame F1 in the frame buffer BUF0-1 in the display control information storing section 8. The host CPU 1 sets the manual update command MTAKE(x) in the decoding control information storing section 5 to "1" when the address of the frame buffer for use in the drawing process is updated. The decoding section 3 sets the drawing-completed frame buffer pointer to a value indicating the first frame buffer BUF0-0 when the manual update command MTAKE(x) is set to "1."

Thereafter, the host CPU 1 updates the frame buffer for used in the drawing process from BUF0-1 to BUF0-2, and then from BUF0-2 to BUF0-0, in a circular manner in units of every two successive vertical scanning periods. In addition, when the address of the frame buffer for use in the drawing process is updated, the host CPU 1 sets the manual update command MTAKE(x) to "1" to thereby cause the decoding section 3 to update the drawing-completed frame buffer pointer by a value (in this example, "1") indicated by the update frame number TAKENUM(0).

Similarly, in this example, the host CPU 1 may start the drawing process on the decoding results at an arbitrary time after the start of the decoding. Moreover, although in the illustrated example, the host CPU 1 updates the address of the frame buffer for use in the drawing process in units of every two successive vertical scanning periods, the unit of time at which the address of the frame buffer for used in the drawing process is arbitrarily determined, and moreover, the number of frame buffers by which the address is updated for each update is arbitrarily determined.

SPECIFIC OPERATION EXAMPLE 3

Figure 5:
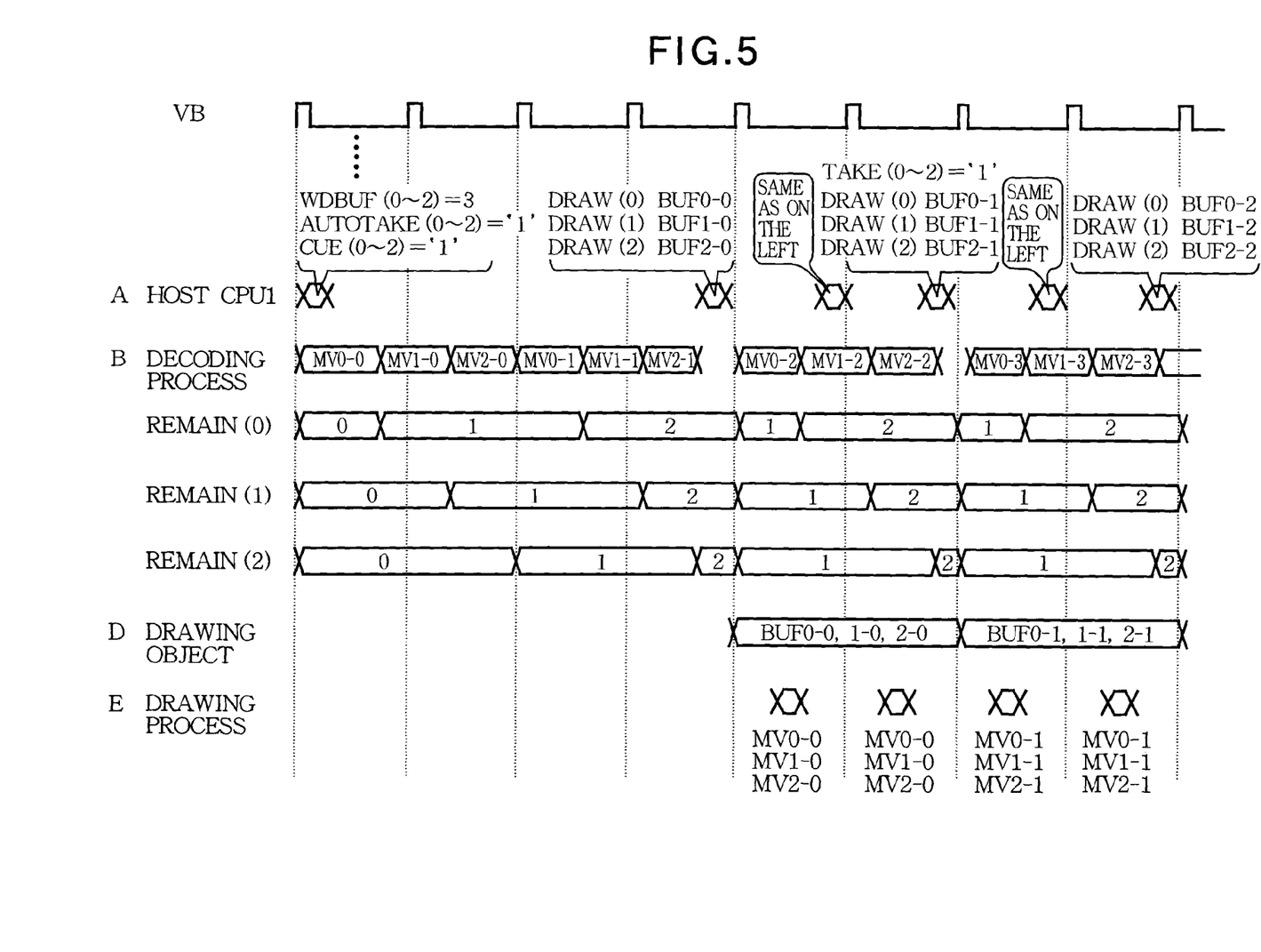
FIG. 5 is a time chart illustrating a specific operation example 3 according to the embodiment.

In the example illustrated in FIG. 5, the host CPU 1 causes the decoding section 3 and the display control section 7 to perform the decoding process and the drawing process on three kinds of moving pictures. When enabling to start the decoding process on the moving pictures, the host CPU 1 determines the moving picture number x of the three kinds of moving pictures and writes a variety of control information necessary for each moving picture number x in the decoding control information storing section 5. In this example, the host CPU 1 sets the moving picture number x to "0," "1," and "2" and sets the buffer numbers WDBUFF(0) to WDBUFF(2) to "3," the frame buffer pointer automatic update commands AUTOTAKE(0) to AUTOTAKE(2) to "1," and all the decoding start commands CUE(0) to CUE(2) for the three kinds of moving pictures to "1."

In this manner, when all the decoding start commands CUE(0) to CUE(2) are set to "1," the decoding section 3 uses the frame buffer BUF0-0 of the ring buffer for the moving picture number 0 as a storage destination of the decoding results and executes the decoding process on the first frame MV0-0 of the moving pictures for the moving picture number 0. Upon completion of this decoding process, the decoding section 3 changes the drawing-uncompleted frame number REMAIN(0) corresponding to the moving picture number 0 from "0" to "1." Next, the decoding section 3 uses the frame buffer BUF1-0 of the ring buffer for the moving picture number 1 as a storage destination of the decoding results and executes the decoding process on the first frame MV1-0 of the moving pictures for the moving picture number 1. Upon completion of this decoding process, the decoding section 3 changes the drawing-uncompleted frame number REMAIN(1) corresponding to the moving picture number 1 from "0" to "1." Next, the decoding section 3 uses the frame buffer BUF2-0 of the ring buffer for the moving picture number 2 as a storage destination of the decoding results and executes the decoding process on the first frame MV2-0 of the moving pictures for the moving picture number 2. Upon completion of this decoding process, the decoding section 3 changes the drawing-uncompleted frame number REMAIN(2) corresponding to the moving picture number 2 from "0" to "1."

In this manner, upon completion of the decoding process for the first frames MV0-0, MV1-0, and MV2-0 of the three kinds of moving pictures, the decoding section 3 sequentially selects the frame buffer BUF0-1 of the ring buffer for the moving picture number 0, the frame buffer BUF1-1 of the ring buffer for the moving picture number 1, and the frame buffer BUF2-1 of the ring buffer for the moving picture number 2, as the storage destination of the decoding results and sequentially executes the decoding process on the second frame MV0-1 of the moving pictures for the moving picture number 0, the second frame MV1-1 of the moving pictures for the moving picture number 1, and the second frame MV2-1 of the moving pictures for the moving picture number 2. In the above decoding process, if the processing objects are the interframe data, the image data for the preceding frame stored in the frame buffers BUF0-0, BUF1-0, and BUF2-0 are referred.

In this example, when the drawing-uncompleted frame numbers REMAIN(0) to REMAIN(2) for the three kinds of moving pictures are all set to "2," in each of the subsequent two successive vertical scanning periods, the host CPU 1 writes three drawing commands for the respective first frames of the three kinds of moving pictures in the display control information storing section 8. That is, the three drawing commands are composed of the drawing command DRAW(0) involving designation of the address of the frame buffer BUF0-0, which is a storage destination of the image data for the frame MV0-0, the drawing command DRAW(1) involving designation of the address of the frame buffer BUF1-0, which is a storage destination of the image data for the frame MV1-0, and the drawing command DRAW(2) involving designation of the address of the frame buffer BUF2-0, which is a storage destination of the image data for the frame MV2-0, The display control section 7 reads these drawing commands from the display control information storing section 8 and executes the drawing process on the frames MV0-0, MV1-0, and MV2-0 instructed by the drawing commands, with a delay of the vertical scanning period after the receipt of the drawing command.

The host CPU 1 enables to perform the drawing process on the first frames MV0-0, MV1-0, and MV2-0 in the two successive vertical scanning periods, and thereafter, in the subsequent, new vertical scanning period, the host CPU 1 sends the drawing commands DRAW(0), DRAW(1), and DRAW(2) for the second frames MV0-1, MV1-1, and MV2-1 to the display control section 7. Therefore, the host CPU 1 sets the automatic update start commands TAKE(0) to TAKE(2) in the decoding control information storing section 5 for the three kinds of moving pictures to "1." With this setting, the drawing-completed frame buffer pointer for each of the three kinds of moving pictures is updated every two vertical blanking signals VB.

In the specific operation example 3 described above, although the drawing processes for the three kinds of moving pictures are started simultaneously, the start time of the drawing process may differ between the moving pictures. In such a case, the time at which the drawing frame automatic update start command TAKE(x) is set to "1" may be determined for each moving picture number x in synchronism with the start time of the drawing process. In addition, in the specific operation example 3 described above, although the frame buffer pointer automatic update command AUTOTAKE(x) is set to "1" for all the three kinds of moving pictures, the frame buffer pointer automatic update command AUTOTAKE(x) may be set to "0" for all the three kinds of moving pictures. Alternatively, some of the moving pictures may have their frame buffer pointer automatic update command AUTOTAKE(x) set to "0," while the others may have the command set to "1."

Hereinabove, although an embodiment of the present invention has been described and illustrated, the present invention may have other embodiments. For example, in the above-described embodiment, the decoding section 3 has updated the drawing-completed frame buffer pointer for the moving picture number x in accordance with the automatic update start command TAKE(x) or the manual update command MTAKE(x) sent from the host CPU 1. However, instead of doing such, the present invention may be constructed such that whenever new drawing command DRAW(x) is written to the display control section 7, the drawing command DRAW(x) is input to the decoding section 3, and when the address of the frame buffer in the drawing command DRAW(x), which is newly input, is different from the address of the frame buffer in the drawing command DRAW(x), which was previously input, the drawing-completed frame buffer pointer is updated so as to correspond to the address just before the address of the frame buffer in the new drawing command DRAW(x).

What is claimed is:

1. An image processing apparatus for processing compression encoded data of a moving picture and outputting image data divided into a plurality of frames for displaying of the moving picture on a display device, the image processing apparatus comprising:

a compressed moving picture memory that stores the compression encoded data of the moving picture;

a work memory that is rewriteable;

a decoding section that uses a storage area of the work memory as a ring buffer composed of a plurality of frame buffers, each for storing image data of one frame, that executes a decoding process on the compression encoded data of the moving picture stored in the compressed moving picture memory while selecting one of the frame buffers of the ring buffer in a circular manner, and that stores the image data that is a decoding result of the compression encoded data of the moving picture in the selected frame buffer;

a frame memory that stores image data to be displayed on the display device;

a controller that outputs a decoding command to the decoding section to initiate the decoding process of the compression encoded data of the moving picture stored in the compressed moving picture memory, and that outputs a drawing command involving designation of a frame buffer among the frame buffers of the ring buffer, the designated frame buffer storing the image data to be subjected to a drawing process of the moving picture, the controller outputting the decoding command and the drawing command at respective timings so that the decoding process and the drawing process are performed asynchronously with respect to each other; and a display control section that performs the drawing process for displaying the image data stored in the frame memory on the display device, the display control section being configured to receive the drawing command from the controller, to read the image data from the frame buffer designated by the drawing command among the frame buffers of the ring buffer, and to reflect the read image data on the image data stored in the frame memory, wherein the drawing process and the decoding process are performed in parallel but independently of each other, wherein the decoding section includes a drawing-completed frame buffer pointer that indicates a frame buffer storing the image data that has completed the drawing process, and the decoding section continues the decoding process on condition that a frame buffer available for storing a decoding result of the compression encoded data of the moving picture is present among the frame buffers up to the frame buffer indicated by the drawing-completed frame buffer pointer, wherein the controller outputs an update command for update control of the drawing-completed frame buffer pointer to the decoding section in accordance with progression of the drawing process, wherein the controller supplies a manual update command to the decoding section when the controller outputs a new drawing command that changes designation of the frame buffer which stores the image data to be subjected to the drawing process, and wherein the decoding section executes the update control of the drawing-completed frame buffer pointer once in synchronism with vertical scanning of the display device whenever the manual update command is received.

2. The image processing apparatus according to claim 1, wherein:

the controller supplies an automatic update start command when the drawing command is output for the first time after the decoding command is output to the decoding section, and the decoding section repeats the update control of the drawing-completed frame buffer pointer in synchronism with vertical scanning of the display device after the automatic update start command is received.

3. The image processing apparatus according to claim 1, wherein:

the controller indicates, to the decoding section, a number of frame buffers to be updated when the drawing-completed frame buffer pointer is updated in accordance with the manual update command, and the decoding section performs the update control of the drawing-completed frame buffer pointer by the number of the frame buffers indicated by the controller in synchronism with the vertical scanning of the display device whenever the manual update command is received.

4. The image processing apparatus according to claim 1, wherein:

when the decoding command and the drawing command are output for a plurality of moving pictures from the controller, the decoding section constructs a plurality of the ring buffers corresponding to the plurality of the moving pictures in the work memory, executes the decoding process of the respective compression encoded data stored in the compressed moving picture memory in accordance with the decoding command for each moving picture, and stores image data obtained through the decoding process in the respective ring buffers corresponding to the moving pictures, and the display control section reads the image data from the respective ring buffers corresponding to the moving pictures in accordance with the drawing command for the moving pictures, and executes the drawing process based on the respective read image data.

5. An image processing apparatus for inputting compression encoded data of a moving picture from a compressed moving picture memory, processing the compression encoded data of the moving picture, and outputting image data divided into a plurality of frames for displaying of the moving picture on an external display device, the image processing apparatus comprising:

a work memory that is rewriteable;

a first storing section that stores a decoding command that is externally provided at a given timing;

a second storing section that stores a drawing command that is externally provided asynchronously in relation to the decoding command;

a decoding section that uses a storage area of the work memory as a ring buffer composed of a plurality of frame buffers, each for storing image data of one frame, that executes a decoding process on the compression encoded data of the moving picture input from the compressed moving picture memory in response to the decoding command while selecting one of the frame buffers of the ring buffer in a circular manner in response to the drawing command, and that stores the image data which is a decoding result of the compression encoded data of the moving picture in the selected frame buffer;

a frame memory that stores image data to be displayed on the external display device; and a display control section that performs the drawing process for displaying the image data stored in the frame memory on the external display device, the display control section being configured to receive the drawing command from the first storing section, to read the image data from the frame buffer designated by the drawing command among the frame buffers of the ring buffer, and to reflect the read image data on the image data stored in the frame memory, wherein the drawing process and the decoding process are performed in parallel but independently of each other, wherein the first storing section is connected to an external host CPU and receives and stores the decoding command, which is output from the host CPU, wherein the second storing section is connected to the external host CPU and receives and stores the drawing command, which is also output from the host CPU, wherein the decoding section includes a drawing-completed frame buffer pointer that indicates a frame buffer storing the image data that has completed the drawing process, and the decoding section continues the decoding process on condition that a frame buffer available for storing a decoding result of the compression encoded data of the moving picture is present among the frame buffers up to the frame buffer indicated by the drawing-completed frame buffer pointer, wherein the decoding section receives an update command for update control of the drawing-completed frame buffer pointer from the external host CPU in accordance with progression of the drawing process, wherein the decoding section receives a manual update command from the host CPU when the host CPU outputs a new drawing command that changes designation of the frame buffer storing the image data to be subjected to the drawing process, and wherein the decoding section executes the update control of the drawing-completed frame buffer pointer once in synchronism with vertical scanning of the external display device whenever the manual update command is received.

6. The image processing apparatus according to claim 5, wherein:

the decoding section receives an automatic update start command from the external host CPU in case that the drawing command is output for the first time after the decoding command is output, and the decoding section repeats the update control of the drawing-completed frame buffer pointer in synchronism with vertical scanning of the external display device after the automatic update start command is received.

7. The image processing apparatus according to claim 5, wherein:

the host CPU indicates a number of frame buffers to be updated to the decoding section when the drawing-completed frame buffer pointer is updated in accordance with the manual update command, and the decoding section performs the update control of the drawing-completed frame buffer pointer by the indicated number of the frame buffers in synchronism with the vertical scanning of the external display device whenever the manual update command is received.

8. The image processing apparatus according to claim 5, wherein:

when the decoding command and the drawing command are output for a plurality of moving pictures from the external host CPU, the decoding section constructs a plurality of the ring buffers corresponding to the plurality of the moving pictures in the work memory, executes the decoding process of the respective compression encoded data stored in the compressed moving picture memory in accordance with the decoding command for each moving picture, and stores image data obtained through the decoding process in the respective ring buffers corresponding to the moving pictures, and the display control section reads the image data from the respective ring buffers corresponding to the moving pictures in accordance with the drawing command for the moving pictures, and executes the drawing process based on the respective read image data.

* * * * *